United States Patent [19]
Arpajian et al.

[11] 3,741,699
[45] June 26, 1973

[54] VARIABLE VOLUME AND CONTROLLED DENSITY FORMING MECHANISM FOR COMPRESSION MOLDING PRESSES

[75] Inventors: Vasken F. Arpajian, Huntingdon Valley; Quentin M. White, Jenkintown, both of Pa.

[73] Assignee: Pennwalt Corporation, Philadelphia, Pa.

[22] Filed: Mar. 15, 1972

[21] Appl. No.: 234,820

Related U.S. Application Data

[63] Continuation-in-part of Ser. No. 45,078, June 10, 1970, Pat. No. 3,661,485.

[52] U.S. Cl. ............... 425/145, 425/149, 425/302, 425/162, 425/256, 425/438
[51] Int. Cl. ...................... B29c 3/04, B29c 3/06
[58] Field of Search ................... 425/135, 149, 307, 425/302, 256, 438, 447, 448, 167, DIG. 16, 162, 145; 249/155, 158

[56] References Cited
UNITED STATES PATENTS

| | | | |
|---|---|---|---|
| 2,402,462 | 6/1946 | Sullivan | 425/382 X |
| 3,665,800 | 5/1972 | Ryder | 249/158 X |
| 2,107,190 | 2/1938 | Shaw | 425/256 X |
| 2,214,505 | 9/1940 | Magnenat | 425/200 |
| 2,762,078 | 9/1956 | Haller | 425/78 |
| 2,810,929 | 10/1957 | Willi | 425/438 X |
| 3,264,703 | 8/1966 | Gatti | 425/171 |
| 3,647,333 | 3/1972 | Smith | 425/256 X |

*Primary Examiner*—Robert L. Spicer, Jr.
*Attorney*—Stanley Bilker

[57] ABSTRACT

An automatic compression molding system, especially for thermosetting materials, in which an extruder preplasticizes the powder and charges the preplasticized mass into preforms. The preheated and preformed mass can be varied in volume, density and temperature prior to being dispensed into the mold cavities.

13 Claims, 5 Drawing Figures

PATENTED JUN 26 1973

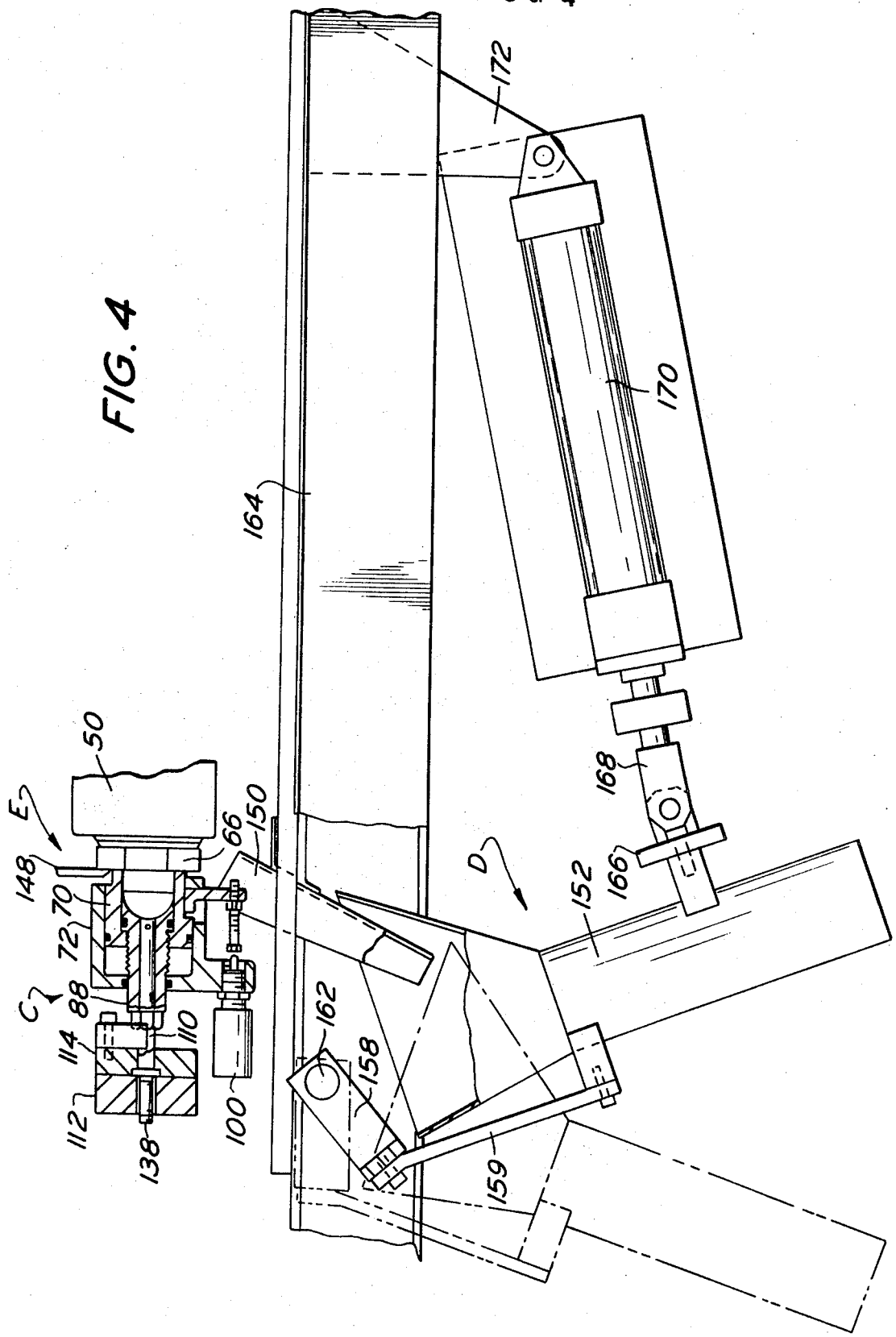

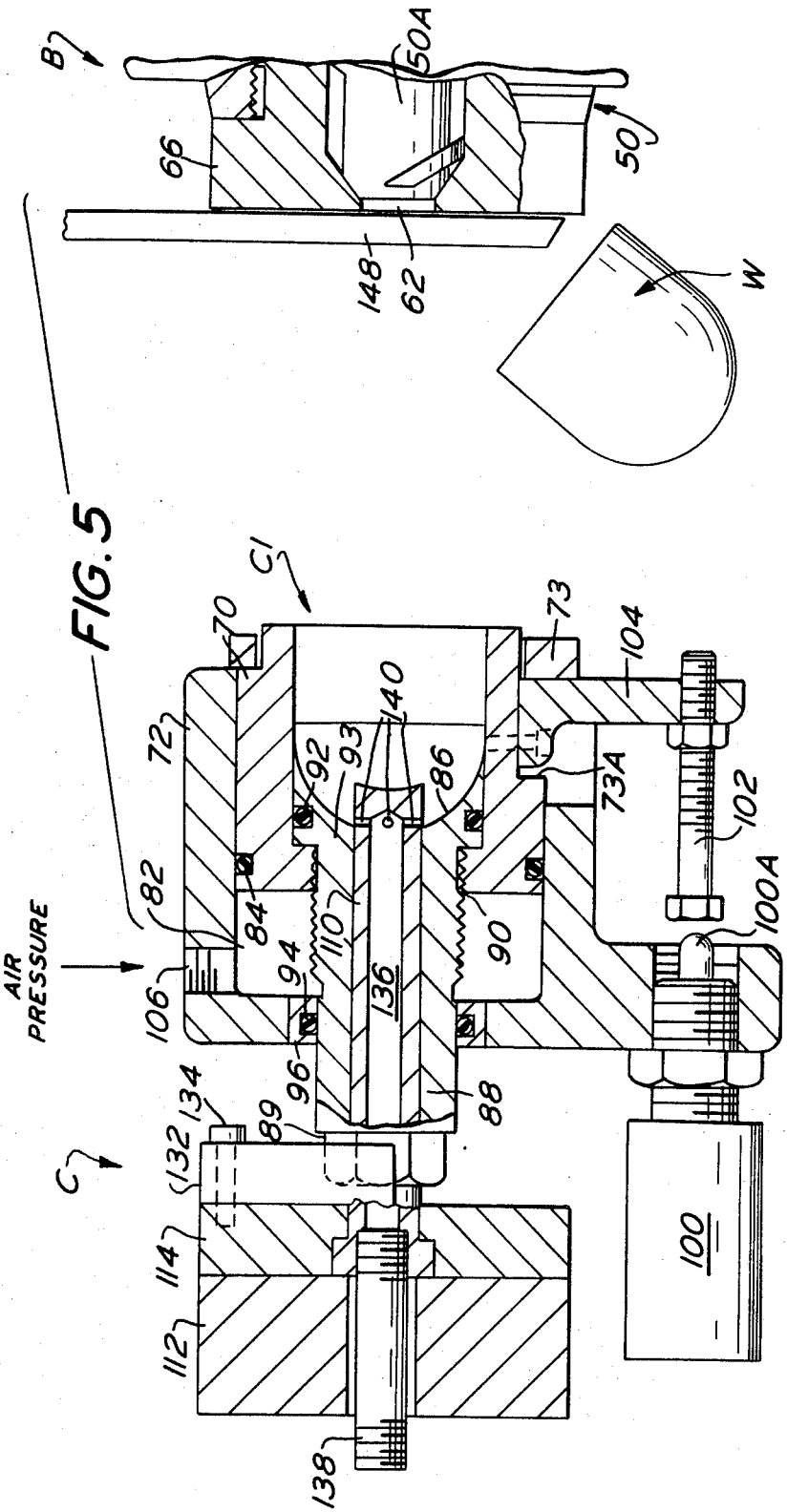

VARIABLE VOLUME AND CONTROLLED DENSITY FORMING MECHANISM FOR COMPRESSION MOLDING PRESSES

RELATED U. S. APPLICATION

This application is a continuation-in-part of application Ser. No. 45,078, filed June 10, 1970, now U.S. Pat. No. 3,661,485, granted May 2, 1972.

This invention relates to the molding of plastics, and more particularly relates to the compression molding of plastic materials, especially thermosetting resins.

In a conventional compression molding cycle, a predetermined volume of cold molding powder is delivered to the die cavity in the press and molded into the desired shape by urging a movable platen or force plate of the press into closed engagement with a stationary platen. The molding powder is usually a thermosetting resin, although thermosplastics are also compression molded on occasion where the molded parts require minimal internal strain.

One of the basic problems encountered in compression molding of cold powder thermosetting materials is the relatively long period of time of the cycle, a goodly portion of which involves the heating of the plastic to a plasticized condition, wherein it readily flows and then cures in the mold. In the past, compression molding cycle times have been reduced by preheating the raw powder using infra red lamps, high frequency radio waves and by reciprocating screw types of extruders. With infra red heating, preheating temperatures are limited to approximately 160°F. and temperatures beyond this range usually cause handling problems by creating a tendency for sticking and excessive residence time of portions of the preheated powder. However, reduction in cure times by infra red heating methods have reduced cure times by 10 to 20 percent. While radio frequency preheating permits relatively high preheat temperatures in the order of 240°F., RF and dielectric heating equipment is quite elaborate and relatively expensive in addition to requiring a great deal of attention to keep in good operating order. Attempts to preheat by a reciprocating screw extruder have generally been more costly and did not effect sufficient preheating or plasticity of the change delivered to the mold cavities.

In our prior application, Ser. No. 45,078, we showed and described a preplasticizing system for compression molding machines in which a screw type extruder preplasticized the powder and charged the preplasticized mass through a nozzle into a set of preform cups. These preheated and preformed masses were then immediately dispensed into the mold cavities to reduce the time of the cure cycle up to 80 percent of the time expended during cold powder compression molding.

The present invention constitutes an improvement over our prior invention in that means are provided to rapidly vary the size of the preformed masses which are delivered to the cavities as well as to control the density of the mass to an extremely fine degree.

It is therefore an object of this invention to provide an improved preforming system for shaping masses of preplasticized material to be delivered to the mold cavities of a compression molding press.

Another object of the invention is to provide a means to shape masses of preplasticized material for a compression molding press wherein the size of the masses can be easily adjusted.

Still another object of this invention is to provide a variable volume preforming system for a compression molding press in order to permit change in size of the preformed mass to suit the size of mold cavities.

Yet still another object of this invention is to provide a preforming cup system for a compression molding press wherein the density of the mass being shaped can be accurately controlled.

Still a further object of this invention is to provide a preforming system for preplasticizing masses of shaped material to be delivered to a compression molding press wherein an improved dispensing mechanism shortens cycle times to a degree not previously attained.

Yet a further object of this invention is to provide a new and improved means for cooling the preforming cups to prevent sticking of the masses.

Other objects of this invention are to provide an improved device of the character described which is easily and economically produced, sturdy in construction and highly efficient and effective in operation.

With the above and related objects in view, this invention consists of the details of construction and combination of parts as will be more fully understood from the following detailed description when read in conjunction with the accompanying drawings in which:

FIG. 4 is a fragmentary view and partly in section of the forming and dispensing mechanism embodied in this invention.

FIG. 5 is an enlarged sectional view of the forming mechanism in retracted position.

Figure 1:
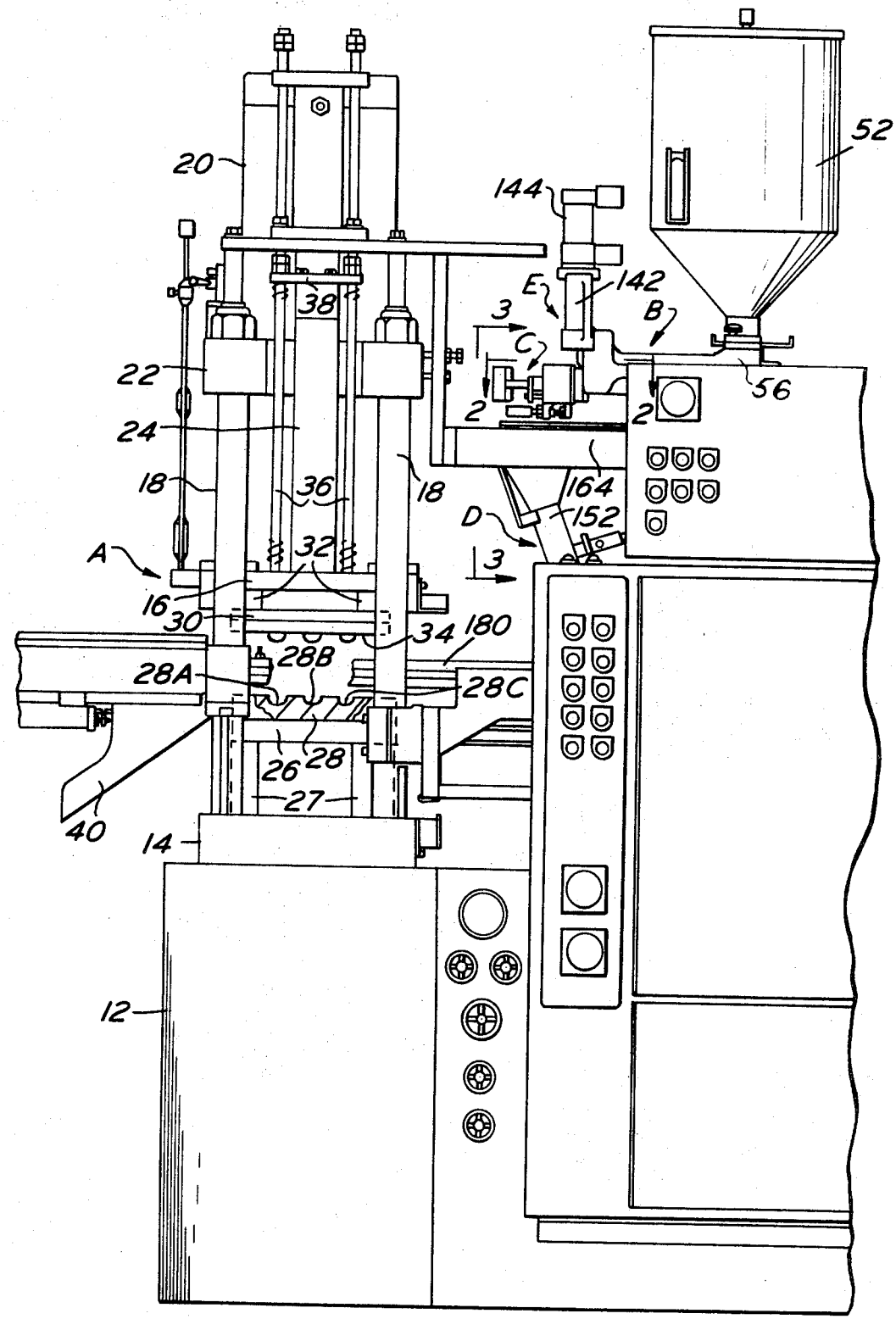
FIG. 1 is a side elevational view of an automatic compression molding press which incorporates a variable volume plasticizing system embodying this invention.

Referring now in greater detail to the drawings in which similar reference characters refer to similar parts, there is shown an automatic compression molding press for thermosetting materials comprising a molding section, generally designated as A, a plasticizing section, generally designated as B, a preforming section, generally designated as C, and a dispenser D for carrying formed masses of plasticized material from the preforming section C for delivery to the cavities of the molding section.

The compression molding press section A is generally conventional and includes a base 12 upon which is mounted a stationary platen 14. A movable platen 16 is vertically reciprocable upon guide posts 18 upstanding from the stationary platen 14 and is actuated by hydraulic clamping cylinder 20 mounted on headplate 22 and operating piston rod 24. A fixed heating platen 26 is supported by legs 27 which are bolted to the stationary platen 14. Mold plate 28 having three horizontally spaced rows of cavities 28A, 28B and 28C, for example, is affixed to the top of heating platen 26. Heating platen 30 is secured to the movable platen 16 by legs 32 downwardly depending therefrom. Bolted to the heating platen 30 is an upper mold plate or force plate 34 having three plungers in alignment and cooperating with the respective cavities 28A, 28B and 28C to form simultaneously three molded components, such as radio or television knobs, from a thermosetting plastic composition, for example a phenolic resin. Ejector pins 36 suspended from retainer bar 38 are slidably received within aligned bores passing through the heating platen 30, the force plate 34 and the respective plungers thereof, and are adapted to downwardly eject molded components from the upper mold plate 34 after the press has opened. Duct 40 adjustably affixed to the posts 18 defines a conduit through which the finished parts are discharged into a suitable collection bin.

Figure 2:
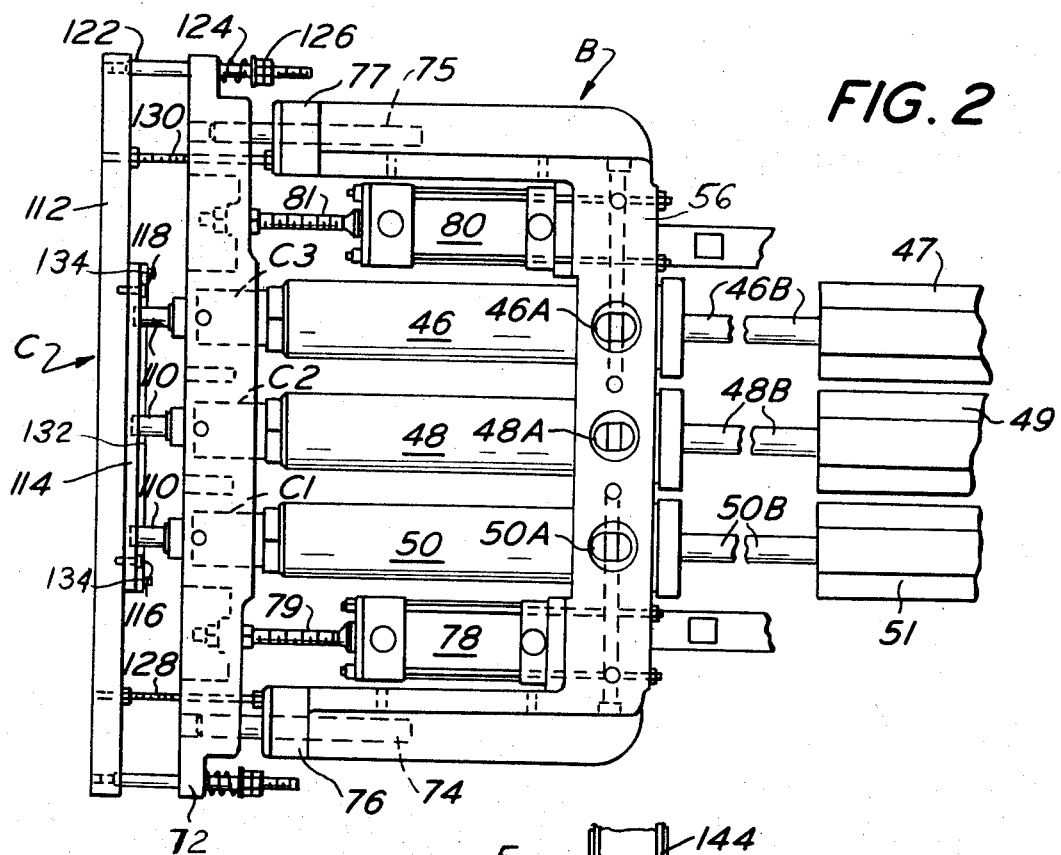
FIG. 2 is a sectional view taken along lines 2—2 of FIG. 1.

Referring particularly to FIG. 2, the plasticizing section B comprises a plurality of extrusion cylinders 46, 48 and 50, one cylinder for each row of mold cavities. Thermosetting resin powder is fed into the extrusion cylinders from a common hopper 52 which is suspended above the cylinders by suitable brackets anchored on frame 56. The hopper 52 is connected with the feed throats 46A, 48A and 50A of the cylinders to permit delivery of thermosetting material into the extrusion cylinders for plasticization. The extrusion cylinders include respective screws 46B, 48B and 50B which are rotatably driven at predetermined intervals by hydraulic motors 47, 49 and 51. The extrusion cylinders 46, 48 and 50 are heated in the usual manner by jacketed heated fluid mediums or electric elements (not shown) in a conventional manner. In the course of operation, the final high degree of plasticization of the material being extruded is adjustably controlled by varying the annular spacing between the conical leading edge of the screw, and the tapered front wall of the cylinder bore adjacent the orifice 62 as shown in FIG. 5. It is to be observed that the annulus is immediately adjacent the face of the nozzle 66 to minimize residence time and to minimize the amount of material retained in the nozzle after cut off.

The performing Section C comprises a plurality of cups C1, C2 and C3, one for each cylinder, which are horizontally reciprocable into abutting engagement with respect to the discharge ends thereof. In this regard, the extrusion cylinders have flat blunt discharge nozzles which cooperate with the preform cups to capture the plasticicized material being extruded from the nozzles and form the extruded material into respective bell-shaped masses or wads. The cups C1, C2 and C3 are retained in spaced laterally disposition with respect to each other in a horizontally reciprocable transverse housing 72 which contains wells for seating the cups. Lock plates 73 retains the cups in the corresponding wells of the housing 72. The transverse housing 72 has a pair of lateral rods 74 and 75 which are guided in respective guide block slide bearings 76 and 77. Hydraulically actuated cylinders 78 and 80 are adapted to reciprocate the housing 72 through piston rods 79 and 81. Actuation of the cylinders 78 and 80 moves the cups C1, C2 and C3 into and out of abutting disposition with the blunt nozzles 66 of the extrusion barrels. See FIG. 2 and 5. However, it is also apparent that a single extrusion cylinder may feed a plurality of preform cups through branched manifold lines delivering plasti-cized material to separate orifices.

Referring now to FIGS. 4 and 5, the cups C1, C2 and C3 include a barrel or sleeve portion 70 which is slidably supported within a corresponding well 82 formed in housing bar 72. An o-ring 84 supported in a peripheral grove at the rear of the barrel 70 acts as a seal for the space 82 which is air pressurized. An adjustable rear wall for each barrel is defined by surface 86 which is formed at the forward portion of spindle 88. The surface 86 is preferably spherical in configuration to maximize the volume capacity of the cups C although a conical surface configuration could also be embodied. The spindle 88 is threaded within the barrel 70 at 90 whereby the volumetric size of each of the cups C may be varied by turning the spindle to move surface 86 forwardly or rearwardly. O-ring 92 in a peripheral groove at the enlarged head 93 of the spindle acts as a sliding seal between the outer periphery of the head 93 and the inner surface of the barrel 70. O-ring 94 in bushing 96 pressed into the housing bar 72 acts as a seal for the rear portion of the spindle 88. The end of the spindle 88 includes a hexnut 89 to permit turning the spindle by means of a suitable end wrench.

At the lower portion of the housing bar 72 immediately below each of the cups C1, C2 and C3 is mounted a corresponding limit switch 100. The contacts of microswitch 100 are normally closed and electrically connected to the extruder screw motors, one microswitch being adapted to open the circuit to the corresponding screw motor 47, 49 and 51 when tripper 100A is engaged by trigger stud 102. The respective studs 102 are adjustably retained in a skirt 104 downwardly depending from and attached to the forward portion of the corresponding barrel 70. It is to be observed that the retainer plate 73 engages the barrel shoulder 73A which enables the forward edge of the respective cup barrels 70 to project approximately one-sixteenth inch beyond the retainer strip. When the cups C are in charging position against the nozzle faces 66 and are filled by plasticized material being extruded from the cylinders 46, 48 and 50, they are moved rearwardly on the cushion of air, approximately 25 p.s.i. in each of the wells 82, and cause the respective limit switches to trip and turn off the screw motors. A threaded bore 106 is provided in the housing bar 72 leading to each of the wells 82 and is adapted to be coupled by way of a fitting (not shown) to a source of compressed air under regulated pressure, for example 25 p.s.i. When the cups are not in contact with the nozzle faces, the air pressure being maintained in each of the wells 82 moves the barrel 70 forwardly in the manner of a piston against the retainer plate 73 as shown in figures. Abutment of the forward end of each barrel against the corresponding face of the nozzles 66 of course causes retraction of the barrel 70 into wells 82 so that the barrel is flush with the face of retainer plate 73 which is in turn also against the nozzle face. At this stage, limit switch 100 contacts would still be closed by virtue of non-abutment of nose tripper 100A with stud 102. When thermosetting material is plasticized and extruded through the nozzles 62 into the respective cups the pressure of the thermosetting material in the cups will cause them upon being filled to a predetermined degree (i.e. density) to move rearwardly against the cushion of air in the wells. When the pressure in the cups C becomes equal to and then overcomes the air pressure in the wells 82, the barrels 70 are urged rearwardly approximately 0.020 inch such that the stud 102 engages the tripper nose 100A to cause limit switch contacts to open and stop the respective screw rotation. By varying the air pressure in the wells, it is easily seen that the tension of the preforms within the cups may be controlled as desired.

Referring now to FIGS. 2, 4 and 5, the cups C1, C2 and C3 each includes an ejection finger 110 which retains the plasticized wad against the face 66 of the corresponding extrusion nozzle upon retraction of the cups. These ejection fingers 110 extend from ejector crossbar 112 and slidably project through bores in the respective spindles 88. Plate 112 retains the fingers 110 in position within the ejector crossbar 112 and is itself held thereon by suitable bolts 116 and 118. The crossbar 112 is affixed to end guide rods 120 and 122 which project from the distal face thereon and are slidably received in slide bearings at each end of housing bar 72. Coil springs 124 are concentrically mounted on the guide and 122 and are compressed between the housing bar 72 and stop nuts 126 threaded at the ends of the guide rods to resiliently urge the crossbar 112 toward the transverse bar 72. Finger retraction studs 128 and 130 extend forwardly from the face of the crossbar 112 adjacent each end thereof and project slidably through bores in the transverse bar 72. The ends of the retraction studs 128 and 130 are adapted to abut up against the bearing blocks 76 and 77 which act as stops when the transverse bar 72 is drawn against the extrusion cylinder nozzles. Thus, when the preform cups C1, C2 and C3 are in abutment with the extrusion nozzles, as shown in FIGS. 2 and 4, the retraction studs 128 and 130 engage the stop blocks 76 and 77 so as to space the crossbar 112 apart from transverse bar 72 against the bias of the coil springs 124. The ejection fingers are accordingly drawn toward the rear of the preform cups until the tips thereof are flush with the back walls 86. See the position of ejection finger 110 in cup C2 as illustrated in FIG. 4. In this portion, a bell shaped mass W of plastic material is compacted within the cup interior. When the transverse bar 72 is moved rearwardly, such that the cups are withdrawn from engagement with the respective nozzles 66, studs 128 and 130 remain in abutment with their blocks 76 and 77 during the first portion of the stroke of transverse bar 72. The bias of the coil springs 124 thereby urges the crossbar 112 toward the transverse bar 72 during withdrawal thereof, so that the ejection fingers project into the cup cavity and press against the wad W, as shown in FIGS. 5. Thus, when the cup 70, for example, is in the partially retracted position, the preformed mass W is stripped out of cups C by the ejection finger 110 and kept against the nozzle face 66 of the respective of of extrusion cylinders. Further retraction of the transverse bar 72 and its preform cups fully exposes the formed compacted wad W in preparation for cut off. Attention is herein invited to the fact that the volumetric size of the preform W is dependent solely upon the adjusted position of the back wall 86 while the density of the wads is determined by the air pressure in the wells 82.

Referring to FIG. 5, it is to be observed that the adjusted position of the spindle 88 with respect to the barrel 70 is accomplished by turning the hex extension 89 of spindle 88 so that the threads 90 draw the head 93 inwardly or outwardly with respect to the barrel 70. After the position of surface 86 is appropriately adjusted, locking bar strip 132 having open ended "hex" notches for engagement with the nuts 89 is fitted therewith and secured to the plate 114 by cap screws 134. Thus, the lock strip 132 prevents rotation of the spindles 88 once their position has been established, it is also to be noted that the ejection fingers 110 have an internal bore 136 which is coupled to a source of air at fitting 138. Ports 140 adjacent to the closed end of each ejection finger 110 are maintained within the spindle 88 when the end thereof is flush with surface 86. However, when the ejection finger 110 is pushed into the cup C, the ports 140 are exposed so that jets of air moving therethrough are adapted to cool the interior surface of the cups preparatory to extrusion of the next set of wads W into the cups thereby preventing sticking as a result of overheating.

Figure 3:
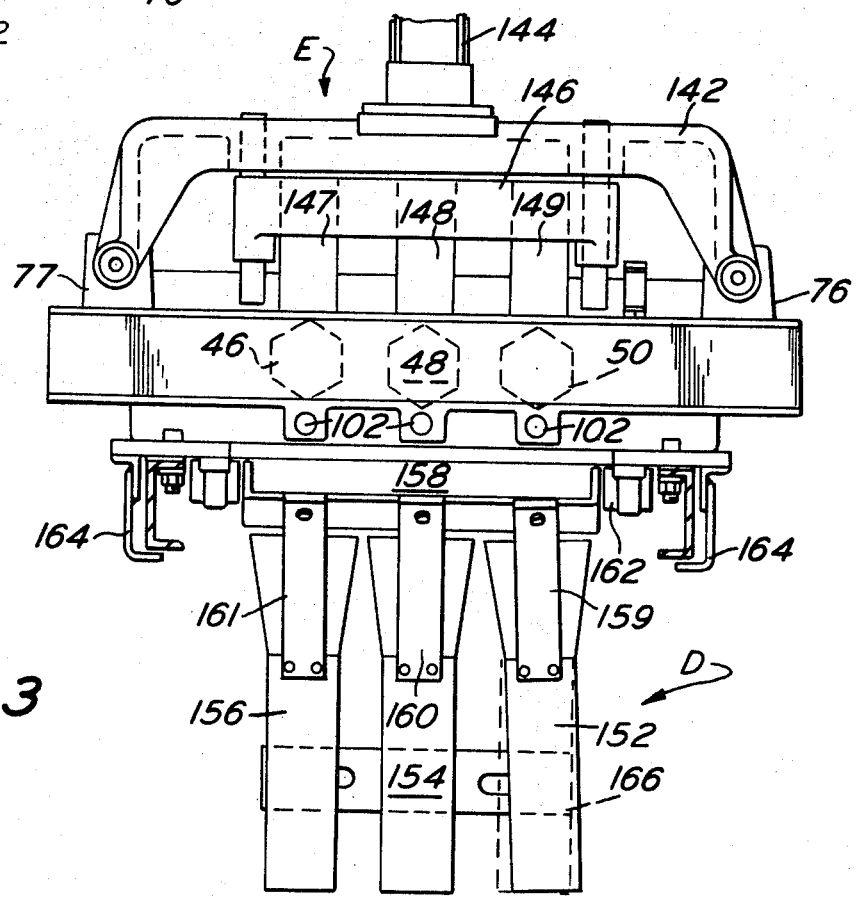
FIG. 3 is a sectional view taken along lines 3—3 of FIG. 1.

The preform Section C also includes a cut-off head E which is adapted to shear the compacted wads or buds W formed on the ends of the extrusion nozzles for deposit into the dispenser chute D. The cut-off head E is suspended above the preform section by a frame 142. The frame 142 is mounted on the bearing guide blocks 76 and 77 and straddles the extruder nozzles. An air cylinder 144 is mounted on the frame 142. The piston of air cylinder 144 carries a guillotine knife 146 which includes blades 147, 148 and 149 in sliding contact with the respective faces of the extruder nozzles. Normally, the blades 147, 148 and 149 are held in raised position above the upper level of the preform cups C, as shown in FIGS. 1, 3 and 4. FIG. 5 illustrates the depressed position of the blades such that the masses W are lopped off from the extruder nozzle and allowed to drop into the appropriate channels of the chute D.

The dispenser Section D is best shown in FIGS. 3 and 5 and essentially comprises a chute which a series of feed tubes 152, 154 and 156 which catches the sheared off preformed masses W for deposit into feedboard 180 for subsequent transfer to the respective mold cavities 28A, 28B and 28C. The feed tubes 152, 154 and 156 are integrated upon a swinging bracket 158 by way of three downwardly depending legs 159, 160 and 161, the brack 158 being pivotally supported on pillow block bearing 162 carried by mounting frame 164. The medial portion of the tubes 152, 154 and 156 are further coupled to a crosspiece 166. The crosspiece 166 is connected to piston rod extension 168 which is horizontally advanced upon actuation of air cylinder 170. The air cylinder 170 is suspended by its rear end from hanger 172 mounted to 164. Reverse actuation of the cylinder 170 enables the chute D to be withdrawn to its starting position. However, entirely the piston of air cylinder 170 is adapted to be moved forwardly into a position for directing the preformed masses W onto a feedboard 180 where they may be properly charged into pockets having locations corresponding to mold cavity locations. The feedboard 180 then deposits the wads W into the respective rows of mold cavities 28A, 28B and 28C.

As is apparent from the foregoing description, the preforming mechanism operates as follows:

The preform shot size is adjusted by loosening screws 134 of locking bar 132 and slide off the "hex" flats of spindle 88. Turn the spindle 88 using a wrench on the hexnut end 89 until the desired shot size is achieved by virtue of the position of the surface 86 within barrel 70. Minor increase or decrease in shot size can be accomplished by increase or decrease of pneumatic pressure in the wells 82. When shot size is ascertained, lock spindle assembly 88 by lock bar 132 and cap screw 134. The density of the wads which are formed in the cups C is adjusted within certain limits by increasing or decreasing the air pressure to port 106 to a value greater or less than a minimal 25 p.s.i.

During cure cycle of the press A, preparation of the preforms W is performed for the next succeeding molding cycle. The entire assembly of preform cups C is advanced against the nozzles 66 of the screw barrels 46, 48 and 50 to close off the ports 62 thereof. During this portion of the stroke, the ejection pins 110 are oriented with their ends flush with the surface 86 by virtue of adjustable abutment of the studs 128 and 130 against the pillow blocks 76 and 77. The preform cups C1, C2 and C3 are each retracted into their respective wells approximately one-sixteenth inch and are flush with the retainer plate 73 and nozzle face. The screws 46A, 48A and 50A are rotated in their respective barrels by motors 47, 49 and 51 to plasticize the thermosetting material into the cups C. The temperature of the charge being extracted is controlled by the heat input to the barrels, the degree of back pressure on the screws, the speed of rotation of the screws, and the position of the nose of the screws with respect to the tapered nozzle orifices.

As each cup reaches completely filled state with the preform at desired density, pressure in the preform cups overcomes the pre-set air pressure in wells 82. Each cup C is forced away from the nozzle 66 by apprximately .020 inch and actuates its corresponding limit switch 100 to stop rotation of each screw inadvertently. The wiring diagram to the screw motors 47, 49 and 51 is not shown because such circuitry is well known to those skilled in the art. When all three cups C1, C2 and C3 have been filled, the entire bar assembly 72 is retracted from the barrel nozzles by cylinders 78 and 80. During the initial portion of retraction stroke, approximately one-half inch, ejection pin assembly, pins 110 and bar 112, maintains its relative position with respect to the nozzles 66 while the cups C1, C2 and C 3 and housing bar 72 withdraw. Accordingly, the wads W are stripped from the cups and they are left attached to the faces of the nozzles. As the tip of the pins 110 extend into and beyond the surface 86, the air ports 140 are exposed to direct air into the cups for cooling on the next cycle.

When the entire cup assembly C is retracted, shear assembly E is depressed through actuating of cylinder 144 so that the blades 147, 148 and 149 chop wads from the nozzles. The wads then fall from the chute 158 into the respective feed tubes 152, 154 and 156, the cylinder 170 having been actuated to a forward position. The wads W drop down into a first set of pockets in fee board 180 whereupon a next series of preforms are prepared. The cylinder 170 automatically indexes to the second set of pockets to be filled by wads W. In a nine cavity mold consisting of three rows of three cavities 28A, 28B and 28C, a third set of wads is prepared and dropped into the third set of cavities in the feedboard 180 whereupon all nine wads W are dropped into the mold cavities 28A, 28B and 28C when the press A has opened.

Although, this invention has been described in considerable detail, such description is intended as being illustrative of that claim limiting since the invention may be variously embodied without departing from the spirit thereof, and the scope of the invention is to be determined as claimed.

What is claimed is:

1. In a compression molding press having a mold plunger reciprocable with respect to a mold cavity element, means for screw plasticizing a charge of thermosetting powder and extruding the charge at an elevated temperature through a nozzle, preforming means for shaping the preheated extrusion into a generally compact mass, and means for delivering the preheated and preformed mass to the mold cavity element immediately prior to closure of the press, said preforming means constituting at least one cup having an open end adapted to be interposed over a corresponding nozzle and a closed wall portion slidably adjustable with respect to the open end whereby the volume of shaped masses within said cup may be varied to suit the size of the mold cavity, and sensing means associated with each said cup for shutting off said means for plasticizing when the pressure of the mass being shaped within said preforming means exceeds a predetermined level.

2. The invention of claim 1 wherein said preforming means includes a cylinder and a piston slidable therein, and means for applying a predetermined loading force with respect to said piston in order to establish the level of charge pressure for actuating said sensing means whereby the density of the shaped masses may be controlled.

3. The invention of claim 2 wherein the mold cavity element includes a plurality of mold cavities arranged in rows and files and said pre-forming means includes a shaping member for each file of cavities.

4. The invention of claim 3 including means for ejecting the preformed masses from the respective cups open retraction thereof from said nozzle, and means for shearing the preformed masses from the nozzles after the cups have been retracted.

5. The invention of claim 4 includes means for cooling said preforming means upon retraction of the cups from the nozzle.

6. The invention of claim 5 wherein said means for cooling comprises a tubular finger having a closed end with ports, and a source of air applied to the open end of said tubular finger.

7. The invention of claim 6 including a chute with feed tubes interposed below said nozzles for funneling preformed masses sheared therefrom, and a feed board having pockets therein corresponding to the rows and files of the mold cavities, said feed board collecting preformed masses funneled by said feed tubes and depositing said masses into the mold cavities when the press is open.

8. The invention of claim 2 wherein said means for applying a predetermined loading force is adjustable.

9. The invention of claim 2 wherein said means for applying a predetermined loading force comprises means for applying air pressure behind said piston.

10. In a compression molding press having a mold plunger reciprocable with respect to a mold cavity element,
means for screw plasticizing a charge of thermosetting powder and extruding the charge at an elevated temperature through a nozzle as an elongate preheated extrusion,
cup means for constraining and cumulatively shaping the preheated extrusion into a generally compact bulbous mass,
means for advancing said cup means into closed disposition over the nozzle for receiving the preheated extrusion and then retracting after the mass is formed,
sensing means associated with said cup means and operative to cut off said means for screw plasticizing when the pressure of the charge formed within said cup means exceeds a predetermined level.
said sensing means being adjustable for controlling the density of the mass being formed, and means for delivering the preheated and shaped mass to the mold cavity element prior to closure of the press.

11. The invention of claim 10 wherein said cup means includes an open end adapted to abut the nozzle and a closed wall portion slidably adjustable with respect to the open end whereby the volume of shaped masses may be varied to suit the size of the mold cavity.

12. The invention of claim 11 wherein said closed wall portion constitutes a piston and said sensing means includes means for applying a predetermined loading force on said piston.

13. The invention of claim 12 wherein said means for applying a predetermined loading force is air actuated.

* * * * *